S. THOMAS & F. STAIT-GARDNER.
TRUCK FOR RAILWAY AND TRAMWAY VEHICLES.
APPLICATION FILED DEC. 14, 1916.

1,242,075.

Patented Oct. 2, 1917.

Inventors:
Sidney Thomas, and
Frank Stait-Gardner,
by Spear, Middleton, Donaldson & Spear
Atty's.

UNITED STATES PATENT OFFICE.

SIDNEY THOMAS AND FRANK STAIT-GARDNER, OF LONDON, ENGLAND.

TRUCK FOR RAILWAY AND TRAMWAY VEHICLES.

1,242,075.          Specification of Letters Patent.          Patented Oct. 2, 1917.

Application filed December 14, 1916. Serial No. 137,016.

*To all whom it may concern:*

Be it known that we, SIDNEY THOMAS and FRANK STAIT-GARDNER, citizens of Great Britain, residing at 26 Budge Row, Cannon street, London, E. C., England, have invented new and useful Improvements in Trucks for Railway and Tramway Vehicles, of which the following is a specification.

This invention relates to improvements in the suspension of the trucks or under-carriages of railway or tramway vehicles of the type which permits the journal-box and axle to move laterally so that the wheel flanges and rails may be relieved from the otherwise excessive pressure produced by the weight of the vehicle when turning curves. The present invention consists in the improved construction hereinafter described and shown in the accompanying drawings.

In the present invention we use the known combination of an axle box free to move vertically and laterally under the control of the springs in the hornplates or recesses in the truck frame, a saddle or hanger suspended from the top of the axle box and capable of swinging laterally relative thereto, trussed side frames together with the usual body springs; the struts or spring posts which unite the top and bottom bars of the truss passing through holes in the truck frame and the springs being arranged between the truck frame and the top and bottom bars of the side frame, coaxial with the spring posts.

We append drawings illustrating our invention, in which—

Figure 1:
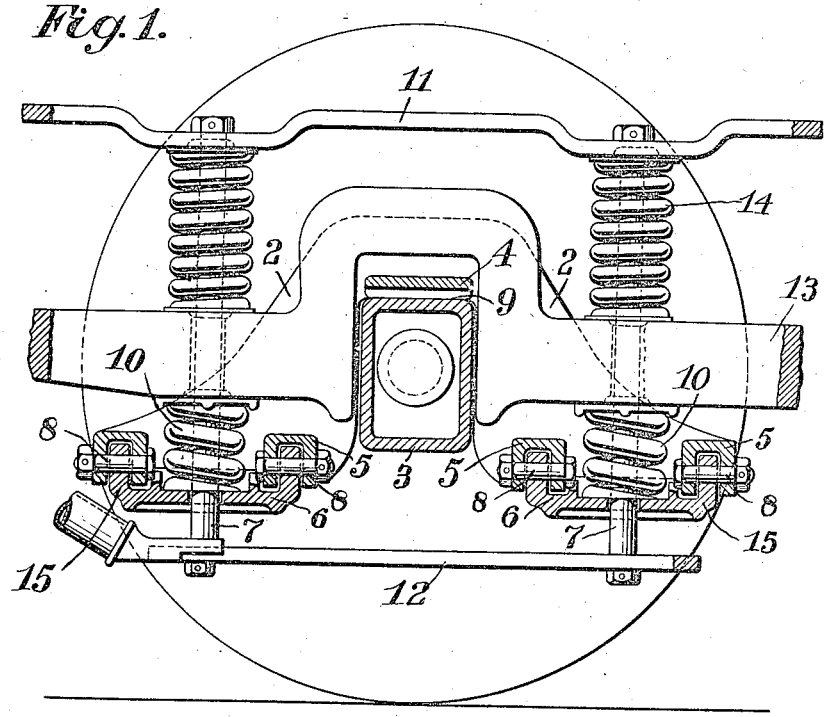
Figure 1 is a sectional side elevation.
Figure 2:
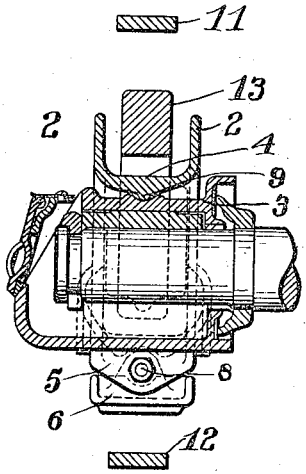
Fig. 2 is a transverse section through the axle box.

Each hanger is made of two similar plates 2 approximately parallel which embrace the sides of the axle box 3 and are integrally united near the top by a plate 4 adapted to rock on the top of the axle box, in a manner well known. The lower part of the hanger which is extended on each side of the axle box, instead of being adapted as usual to support the lower ends of the springs, are adapted at 5 to receive two spring caps 6 through which the usual spring posts 7 of the side frame pass, one on each side of the axle box. The spring caps are jointed to the hanger by bolts or pins 8 parallel to the rocking axis 9 on the top of the axle box. For this purpose the said plates of the hanger are integrally united at the bottom by bridge pieces 5 in which the said bolts or pins are lodged. The surface of the spring cap against which the lower end of the spring 10 abuts is preferably lower than the axis of the bolts or pins, in which case each spring cap is jointed to the hanger by two coaxial bolts or pins as shown, one on each side of the spring; two lugs 15 being integrally formed on each spring cap for this purpose.

The spring posts 7 are bolted at the ends to the top bar 11 and bottom bar 12 of the trussed side frame, and pass through holes in the truck frame 13. This arrangement, and that of the lower springs 10 and upper springs 14 respectively below and above the truck frame, are well known and do not form part of the present invention.

With our invention when any lateral movement takes place the spring cap oscillates relative to the hanger but preserves its direction relative to the spring post and permits the spring always to transmit its load axially.

We claim:

In combination a truck frame, an axle box free to move vertically and laterally, upper and lower truss frame bars, posts uniting said bars and passing through the truck frame, springs between said bars and the truck frame, a hanger, a rocking axis therefor at the top of the axle box and capable of swinging laterally relative thereto, and cap members joined to the lower part of the hanger and turnable about axes parallel to the rocking axis of the hanger at the top of the axle box, said cap members affording supports for the springs below the truck frame, substantially as described.

S. THOMAS.

Witness:
    EDW'D H. STAITE,
                       F. STAIT-GARDNER.
Witness:
    ALBERT VICTOR FLINT.

Copies of this patent may be obtained for five cents each, by addressing the "Commissioner of Patents, Washington, D. C."